United States Patent [19]

Neroznikov et al.

[11] Patent Number: 5,010,963
[45] Date of Patent: Apr. 30, 1991

[54] HYDRAULIC DRILLING MACHINE

[76] Inventors: Jury I. Neroznikov, ulitsa 40 let Kazakhstana, 40, kv.41; Ivan P. Rudakov, both of Karaganda; Valentin N. Fanshtein, 1 mikroralon, 63 kv. 10, Stepnogorsk; Vladimir A. Medyanik, ulitsa Shevchenok, 17, kv. 51, Zheltye Vody; Valentina V. Gavrilova, ulitsa Mukanova, 13, kv. 64, Karaganda, all of U.S.S.R.

[21] Appl. No.: 460,937

[22] PCT Filed: Apr. 14, 1989

[86] PCT No.: PCT/SU89/00095
§ 371 Date: Mar. 2, 1990
§ 102(e) Date: Mar. 2, 1990

[87] PCT Pub. No.: WO89/11022
PCT Pub. Date: Nov. 16, 1989

[30] Foreign Application Priority Data

May 4, 1988 [SU] U.S.S.R. ................ 4473992

[51] Int. Cl.$^5$ ................................ B25D 9/00
[52] U.S. Cl. ................ 173/105; 173/134; 173/139; 92/85 B
[58] Field of Search ......... 173/104, 105, 112, 116, 173/134, 135, 139, 107; 92/85 B, 193

[56] References Cited

U.S. PATENT DOCUMENTS

| 3,918,532 | 11/1975 | Amtsberg | 173/134 |
| 4,039,033 | 8/1977 | Salmi | 173/105 |
| 4,068,727 | 1/1978 | Andersson et al. | 173/139 |
| 4,103,746 | 8/1978 | Reynolds | 173/107 |
| 4,648,467 | 3/1987 | Ahtola et al. | 173/107 |
| 4,934,465 | 6/1990 | Salmi et al. | 173/139 |

FOREIGN PATENT DOCUMENTS

| 337485 | 4/1972 | U.S.S.R. | |
| 354123 | 10/1972 | U.S.S.R. | |
| 1181557 | 9/1985 | U.S.S.R. | |
| 2023054 | 12/1979 | United Kingdom | 173/107 |

Primary Examiner—Douglas D. Watts
Assistant Examiner—Scott A. Smith
Attorney, Agent, or Firm—Fleit, Jacobson, Cohn, Price, Holman & Stern

[57] ABSTRACT

A hydraulic drilling machine comprises a drill tool (1) connected to a hydraulic motor (3), a hydraulic percussive mechanism (4) connected via a hydraulic distributor (15) to a hydraulic pressure line (11) and to a hydraulic discharge line (21), and a means (16) for sucking the liquid from the working chamber of the hydraulic percussive mechanism (4) during its idle stroke. The means (16) includes a mixing chamber (17) connected to the discharge line of the hydraulic percussive mechanism, an ejector (18) connected to the discharge line of the hydraulic motor (3), and a diffuser (19) connected to the hydraulic discharge line (21) and accommodating a nozzle of the ejector (18).

1 Claim, 1 Drawing Sheet

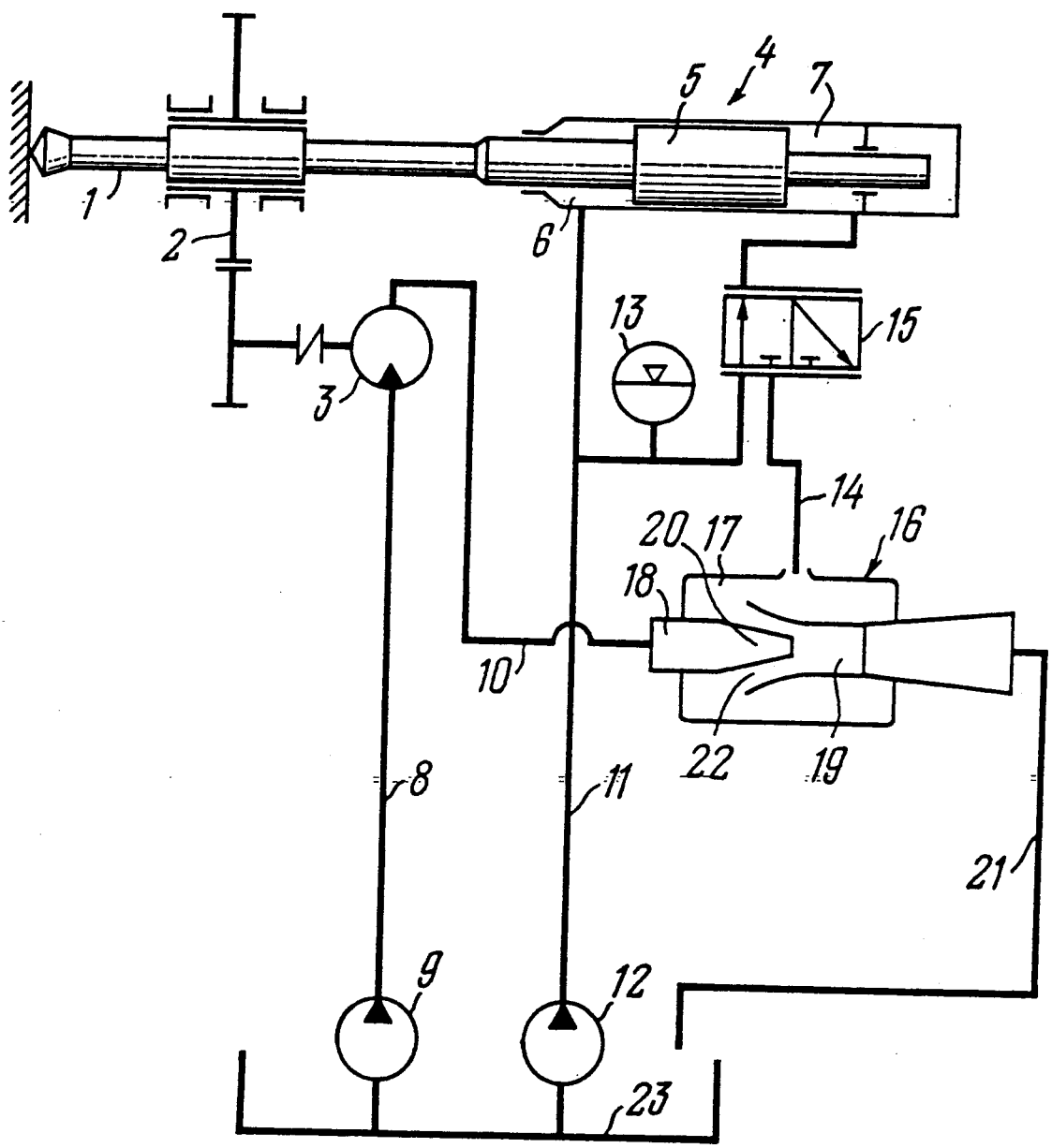

HYDRAULIC DRILLING MACHINE

FIELD OF THE INVENTION

This invention relates generally to equipment associated with operation of mines and quarries, and more particularly to a hydraulic drilling machine intended for drilling boreholes and wells.

BACKGROUND OF THE INVENTION

There is known a hydraulic drilling machine comprising a drill tool and a hydraulic percussive mechanism. The hydraulic percussive mechanism includes a housing, a piston hammer, a pressure stabilizer, a liquid flow distributor, and a feeding air line with a source of compressed air. The pressure stabilizer serves to reduce inertia losses of the machine and increase the impact power of the hydraulic hammer, and has the form of a cylinder with a freely floating piston dividing the cylinder into a gas cavity and a hydraulic cavity. Part of the liquid that worked in the hydraulic hammer is conveyed to the hydraulic cavity. The gas cavity of the stabilizer communicates with the air network and with the idle stroke chamber (cf., SU, A, 337, 485).

However, in this hydraulic drilling machine the pressure stabilizer is structurally complicated, requiring a high degree of manufacturing accuracy of its moving parts.

One disadvantage of the above machine resides in that the moving parts are susceptible to fast wear, making the machine less reliable in operation.

From the working chamber of the hydraulic hammer the spent liquid is directed in a pulsed flow to the discharge line to be forced out of the discharge cavity of the hydraulic hammer by a plunger, which necessitates extra power consumption.

Another disadvantage is that operation of the pressure stabilizer requires the use of one more type of power in the form of compressed air.

There is also known a hydraulic drilling machine in which the hydraulic hammer accommodates in its housing a movable piston hammer, as well as work and idle stroke chambers periodically communicating with pressure and discharge lines by way of a hydraulic distributor, such as a rotary valve. The pressure line includes a hydraulic accumulator. The hydraulic hammer has one more hydraulic accumulator serving to reduce inertia losses of liquid in the course of the return stroke of the piston hammer. The hydraulic accumulator has the form of a cylinder whose interior is divided by a piston into two chambers of smaller and larger cross section. The first such chamber communicates continuously with the pressure line, whereas the second chamber communicates with the discharge line and periodically communicates with the pressure line in the course of the return stroke of the piston hammer (cf., SU, A, 354, 123).

However, in this hydraulic drilling machine the accumulator is overcomplicated, necessitating high manufacturing accuracy of the piston and precise centering of its elements.

In addition, the provision of a part movable on two surfaces speeds up wearing of the mating parts to result in a leak of the liquid through the piston and less reliable operation. The spent liquid is conveyed from the hydraulic percussive mechanism to the discharge line periodically by the piston and plunger to necessitate extra power expenditures.

The spent liquid moves along the discharge line in a pulsed flow to make the line less reliable.

SUMMARY OF THE INVENTION

The present invention aims at providing a hydraulic drilling machine so constructed as to simplify controlling the hydraulic hammer and reduce the amount of power to be consumed for conveying the spent liquid.

The aim of the invention is attained by that in a hydraulic drilling machine comprising a drilling tool connected through a reduction gear to a hydraulic motor having pressure and discharge lines, and a hydraulic hammer with idle and work stroke chambers, discharge and pressure hydraulic lines communicating with the hydraulic percussive mechanism via a hydraulic distributor, a hydraulic accumulator connected to the pressure line of the hydraulic hammer, and hydraulic pumps, according to the invention, the machine is provided with a means for sucking the liquid from the work stroke chamber of the hydraulic hammer during its idle stroke, this sucking means comprising a mixing chamber connected to the discharge line of the hydraulic percussive mechanism via the hydraulic distributor, an ejector with a diffuser positioned inside the mixing chamber, the ejector being connected to the discharge line of the hydraulic motor and having its nozzle accommodated in the diffuser connected to a hydraulic line common to the hydraulic motor and hydraulic percussive mechanism. The use of the means for sucking the liquid from the work stroke chamber of the hydraulic percussive mechanism substantially simplifies controlling this mechanism. Also, the herein proposed construction affords a more reliable operation of the machine thanks to the lack of moving parts.

Suction of the liquid from the work stroke chamber of the hydraulic percussive mechanism during the idle stroke of its hammer provides a continuous flow of liquid in the discharge line to result in a higher service life of the line due to avoided impacts and pulsewise movement of the liquid therein. For conveying the liquid along the discharge line use is made of the spent working fluid from the hydraulic motor rotating the drill tool, whereby no extra power expenditures are required resulting in a higher efficiency of the drilling machine and simpler pump stations used therein.

In addition, suction of the liquid from the work stroke chamber of the hydraulic percussive mechanism during the idle stroke of its hammer makes it possible to promptly reduce pressure in this chamber to result in a longer stroke of the hammer, higher impact energy, and higher efficiency of the machine.

BRIEF DESCRIPTION OF THE DRAWINGS

The invention will now be described in greater detail with reference to a specific embodiment thereof taken in conjunction with the accompanying drawing showing a schematic of the proposed hydraulic drilling machine.

BEST MODE OF CARRYING OUT THE INVENTION

A hydraulic drilling machine comprises a drilling tool of any known suitable construction connected through a reduction gear 2 with a hydraulic motor 3, and a hydraulic percussive mechanism 4 having a hammer 5 exerting percussive action on the drill tool 1, an idle stroke chamber 6, and a work stroke chamber 7.

The hydraulic motor 3 has a pressure line 8 connected to a hydraulic pump 9, and a discharge line 10. The hydraulic percussive mechanism 4 has a pressure line 11 communicating with a pressure hydraulic pump 12 and having a hydraulic accumulator 13, and a discharge line 14.

The pressure and discharge lines 11 and 14 of the hydraulic percussive mechanism 4 communicate with the idle and work stroke chambers via a fluid distributor 15 of any known suitable design having pressure and discharge cavities.

The hydraulic drilling machine is further provided with a means 16 for sucking the liquid from the working chamber 7 of the hydraulic percussive mechanism during the idle stroke of its hammer. This means 16 includes a mixing chamber 17, an ejector 18, and a diffuser 19. The mixing chamber 17 is connected to the discharge line 14 of the hydraulic hammer 4; the ejector 18 is connected to the discharge line 10 of the hydraulic motor 3 with its nozzle 20 positioned in the diffuser 19; whereas the diffuser 19 is connected to a discharge line 21 common for the hydraulic motor 3 and hydraulic hammer 4.

The proposed hydraulic drilling machine operates in the following manner.

The drill tool 1 of the drilling machine is actuated by the hydraulic motor 3 by the fluid delivered from the hydraulic pump 9. The flow of working fluid is conveyed from the pump 12 along the pressure line 11 to the hydraulic percussive mechanism 4. The hydraulic pressure line 11 continuously communicates with the idle stroke chamber 6. The work stroke chamber 7 communicates alternately via the fluid distributor 15 with the hydraulic pressure line 11 and discharge line 14. At the point when the work stroke chamber 7 communicates with the pressure line 11, the hammer 5 executes a working stroke, whereas when this chamber communicates with the discharge line, it executes an idle stroke. A pulsed flow of the spent liquid is conveyed to the discharge line 21 via the suction means 16. A flow of liquid from the hydraulic motor 3 rotating the drill tool is conveyed along the discharge line 10 to the ejector 18 to escape from its nozzle 20 to the diffuser 19 in the form of a high-speed jet and provide an underpressure. The spent liquid flows from the hydraulic percussive mechanism 4 along the discharge line 14 to the chamber 17 of a volume substantially greater than the volume of the liquid admitted thereto. The spent liquid is sucked into the diffuser 19 via a clearance 22 defined between the nozzle 20 and housing of the diffuser 19. The two flows are mixed in the diffuser 19. A pulsed flow of spend liquid is transformed into a continuous flow. The mixed flow is discharged to a tank 23 through the discharge line 21 common to the hydraulic motor 3 and hydraulic hammer 4.

INDUSTRIAL APPLICABILITY

The proposed hydraulic drilling machine can be used for drilling bore holes up to 65 mm in diameter in hard rock formations and stopes, as well as for mining for natural resources by blast hole drilling and working adits. The machine can also find application for driving tunnels and for tension chain drilling.

We claim:

1. A hydraulic drilling machine comprising a drill tool (1) connected through a reduction gear (2) to a hydraulic motor (3) having a hydraulic pressure line (8) and a hydraulic discharge line (10), and a hydraulic percussive mechanism (4) with an idle stroke chamber (6) and a work stroke chamber (7), hydraulic pressure and discharge lines communicating with the hydraulic percussive mechanism (4) via a fluid distributor (15), a hydraulic accumulator (13) connected to the hydraulic pressure line (11) of the hydraulic percussive mechanism and hydraulic pumps (9 and 12), CHARACTERIZED in that the machine is provided with a means (16) for sucking liquid from the work stroke chamber (7) of the hydraulic percussive mechanism (4) during its idle stroke including a mixing chamber (17) connected to the discharge line (14) of the hydraulic percussive mechanism via the fluid distributor (15), an ejector (18) and a diffuser (19) positioned in the mixing chamber (17), the ejector (18) being connected to the discharge line (10) of the hydraulic motor (3) and having a nozzle (20) positioned in the diffuser (19), said diffuser is connected to a hydraulic discharge line (21) common to the hydraulic motor (3) and hydraulic percussive mechanism (4).

* * * * *